(12) United States Patent
James et al.

(10) Patent No.: US 9,855,890 B2
(45) Date of Patent: Jan. 2, 2018

(54) AUTONOMOUS VEHICLE INTERACTION WITH EXTERNAL ENVIRONMENT

(71) Applicant: Toyota Motor Engineering & Manufacturing North America, Inc., Erlanger, KY (US)

(72) Inventors: Michael R. James, Northville, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 82 days.

(21) Appl. No.: 14/566,974

(22) Filed: Dec. 11, 2014

(65) Prior Publication Data

US 2016/0167648 A1 Jun. 16, 2016

(51) Int. Cl.
*B60Q 1/26* (2006.01)
*B60Q 1/50* (2006.01)
(Continued)

(52) U.S. Cl.
CPC ............ *B60Q 1/503* (2013.01); *B60Q 1/525* (2013.01); *B60Q 5/006* (2013.01); *B60Q 2400/50* (2013.01)

(58) Field of Classification Search
None
See application file for complete search history.

(56) References Cited

U.S. PATENT DOCUMENTS

| 4,600,913 A | * | 7/1986 | Caine | ................... | B60Q 1/302 |
| | | | | | 340/435 |
| 6,282,823 B1 | * | 9/2001 | Brown | ................... | G09F 21/04 |
| | | | | | 40/218 |

(Continued)

FOREIGN PATENT DOCUMENTS

| CN | 102387941 A | 3/2012 |
| JP | 3697520 B2 | 9/2005 |

(Continued)

OTHER PUBLICATIONS

N. Pennycooke, Abstract, "AEVITA: Designing Biomimetic Vehicle-to-Pedestrian Communication Protocols for Autonomously Operating & Parking On-Road Electric Vehicles", Sep. 2012, 184 pages, Full Article available Online at <http://dspace.mit.edu/handle/1721.1/77810>.

(Continued)

*Primary Examiner* — Jonathan M Dager
(74) *Attorney, Agent, or Firm* — Christopher G. Darrow; Darrow Mustafa PC

(57) ABSTRACT

Arrangements relate to the interaction between an autonomous vehicle and an external environment of the autonomous vehicle. Such interaction can occur in various ways. For example, a non-verbal human gesture in the external environment can be detected. The non-verbal human gesture can be identified. A future driving maneuver can be determined based on the identified non-verbal human gesture. The autonomous vehicle can be caused to implement the determined future driving maneuver. As another example, the external environment of the autonomous vehicle can be detected to identify a person (e.g. a human pedestrian, a human bicyclist, a human driver or occupant of another vehicle, etc.) therein. The identified person can be located. It can be determined whether the person is potentially related to a future driving maneuver of the autonomous (Continued)

vehicle. The autonomous vehicle can be caused to send a directional message to the person.

18 Claims, 5 Drawing Sheets

(51) Int. Cl.
  *B60Q 1/52* (2006.01)
  *B60Q 5/00* (2006.01)

(56) References Cited

U.S. PATENT DOCUMENTS

| | | | | |
|---|---|---|---|---|
| 6,940,422 | B1* | 9/2005 | Bachelder et al. | G08G 1/087 340/906 |
| 7,629,898 | B2* | 12/2009 | Kirkpatrick | G08G 1/0965 340/691.6 |
| 8,217,766 | B2* | 7/2012 | Nakayama | B60Q 5/006 340/384.1 |
| 8,248,273 | B2* | 8/2012 | Hayashi et al. | G08G 1/04 340/435 |
| 8,514,100 | B2* | 8/2013 | Yamashita | B60Q 5/006 340/4.1 |
| 8,547,249 | B2* | 10/2013 | David et al. | G08G 1/163 340/435 |
| 8,749,401 | B2* | 6/2014 | Hara | B60Q 1/50 340/425.5 |
| 8,854,229 | B2* | 10/2014 | Kim et al. | B60Q 5/008 340/901 |
| 8,954,252 | B1* | 2/2015 | Urmson et al. | G08G 1/166 180/167 |
| 9,336,436 | B1* | 5/2016 | Dowdall | G08G 1/166 |
| 9,340,178 | B1* | 5/2016 | Khaykin et al. | B60R 21/34 |
| 9,429,947 | B1* | 8/2016 | Wengreen et al. | G05D 1/0016 |
| 9,513,632 | B1* | 12/2016 | Gordon et al. | G05D 1/0061 |
| 2001/0018641 | A1* | 8/2001 | Kodaka et al. | B62D 15/0265 701/301 |
| 2003/0132666 | A1* | 7/2003 | Bond, III et al. | B60T 7/22 303/193 |
| 2003/0149530 | A1* | 8/2003 | Stopczynski | B60R 21/013 701/301 |
| 2004/0193347 | A1* | 9/2004 | Harumoto et al. | B60R 21/0132 701/45 |
| 2005/0196020 | A1* | 9/2005 | Comaniciu et al. | G06T 7/254 382/104 |
| 2006/0265918 | A1* | 11/2006 | Meyer | G09F 21/04 40/411 |
| 2007/0032952 | A1* | 2/2007 | Carlstedt et al. | B60R 21/0134 701/301 |
| 2007/0040664 | A1* | 2/2007 | Johnson et al. | B60Q 1/444 340/467 |
| 2007/0222565 | A1* | 9/2007 | Kawamata et al. | B60R 21/0134 340/435 |
| 2008/0019567 | A1* | 1/2008 | Takagi et al. | G06K 9/00369 382/103 |
| 2008/0260208 | A1* | 10/2008 | Nagaoka et al. | G06K 9/00362 382/104 |
| 2009/0174573 | A1* | 7/2009 | Smith | G08G 1/0962 340/905 |
| 2010/0256852 | A1* | 10/2010 | Mudalige | G08G 1/163 701/24 |
| 2011/0090093 | A1* | 4/2011 | Grimm et al. | G01S 5/0072 340/901 |
| 2011/0140919 | A1* | 6/2011 | Hara et al. | B60Q 1/50 340/907 |
| 2011/0199199 | A1* | 8/2011 | Perkins | B60Q 1/506 340/435 |
| 2011/0205042 | A1* | 8/2011 | Takemura et al. | G08G 1/166 340/435 |
| 2011/0246156 | A1* | 10/2011 | Zecha et al. | G08G 1/166 703/6 |
| 2012/0025964 | A1* | 2/2012 | Beggs et al. | B60Q 1/2673 340/435 |
| 2012/0206597 | A1* | 8/2012 | Komoto et al. | G06T 7/215 348/135 |
| 2013/0229289 | A1* | 9/2013 | Bensoussan et al. | B60Q 5/006 340/902 |
| 2013/0329960 | A1* | 12/2013 | Sandahl et al. | G06K 9/00791 382/104 |
| 2014/0032093 | A1* | 1/2014 | Mills | B60W 40/107 701/301 |
| 2014/0051346 | A1* | 2/2014 | Li et al. | H04H 20/59 455/3.01 |
| 2014/0056438 | A1* | 2/2014 | Baalu et al. | G10K 15/02 381/86 |
| 2014/0092249 | A1* | 4/2014 | Freiburger | H04N 7/181 348/148 |
| 2014/0112538 | A1* | 4/2014 | Ogawa et al. | G08G 1/166 382/103 |
| 2014/0214260 | A1* | 7/2014 | Eckert et al. | B60Q 1/488 701/28 |
| 2014/0240113 | A1* | 8/2014 | Pottier et al. | B60Q 1/26 340/432 |
| 2015/0035685 | A1* | 2/2015 | Strickland et al. | B60Q 9/008 340/901 |
| 2015/0054642 | A1* | 2/2015 | Carruthers | B60Q 5/008 340/463 |
| 2015/0103159 | A1* | 4/2015 | Shashua et al. | G06K 9/00798 348/118 |
| 2015/0151725 | A1* | 6/2015 | Clarke et al. | B60W 30/00 701/28 |
| 2015/0160019 | A1* | 6/2015 | Biswal | G01C 21/26 701/1 |
| 2015/0191117 | A1* | 7/2015 | Arita et al. | B60Q 5/008 340/435 |
| 2015/0197185 | A1* | 7/2015 | Jones | B60Q 1/50 340/468 |
| 2015/0203023 | A1* | 7/2015 | Marti et al. | B60Q 1/00 340/425.5 |
| 2015/0210279 | A1* | 7/2015 | Agnew et al. | B60W 30/09 701/48 |
| 2015/0228195 | A1* | 8/2015 | Beaurepaire et al. | G08G 1/0962 340/907 |
| 2015/0234045 | A1* | 8/2015 | Rosenblum et al. | G01S 13/931 342/71 |
| 2015/0269925 | A1* | 9/2015 | Kanaya | B60Q 5/008 381/71.4 |
| 2015/0329043 | A1* | 11/2015 | Skvarce | B60Q 9/008 340/435 |
| 2015/0331422 | A1* | 11/2015 | Hartung et al. | G05D 1/021 701/23 |
| 2015/0332114 | A1* | 11/2015 | Springer | G06K 9/4604 348/148 |
| 2015/0336502 | A1* | 11/2015 | Hillis et al. | B60Q 1/26 701/23 |
| 2015/0336547 | A1* | 11/2015 | Dagan | B60T 7/22 701/70 |
| 2016/0075332 | A1* | 3/2016 | Edo-Ros | B60W 30/0956 701/70 |
| 2016/0121791 | A1* | 5/2016 | Shimizu | G08G 1/166 340/435 |
| 2016/0132705 | A1* | 5/2016 | Kovarik et al. | G06K 7/10376 340/10.3 |
| 2016/0163198 | A1* | 6/2016 | Dougherty | G08G 1/162 340/905 |
| 2016/0207454 | A1* | 7/2016 | Cuddihy et al. | G08B 6/00 |
| 2016/0229397 | A1* | 8/2016 | Muthukumar | B60R 21/013 |
| 2016/0231746 | A1* | 8/2016 | Hazelton et al. | G05D 1/0212 |
| 2016/0232423 | A1* | 8/2016 | Zhong et al. | G06K 9/52 |
| 2017/0123434 | A1* | 5/2017 | Urano et al. | G05D 1/0278 |
| 2017/0166222 | A1* | 6/2017 | James | B60W 50/14 |

FOREIGN PATENT DOCUMENTS

| | | |
|---|---|---|
| JP | 4816009 B2 | 11/2011 |
| KR | 713587 B1 | 8/2005 |
| WO | 2012047743 A2 | 4/2012 |

(56) References Cited

FOREIGN PATENT DOCUMENTS

OTHER PUBLICATIONS

S. Teller et al., "A Voice-Commandable Robotic Forklift Working Alongside Humans in Minimally-Prepared Outdoor Environments", ICRA 2010 paper, 8 pages.
K. Bullis, "How Do You Know an Autonomous Vehicle Has Seen You?", [online] MIT Technology Review, Apr. 26, 2012 [retrieved Sep. 4, 2014], retrieved from the Internet: <http://www.technologyreview.com/view/427743/how-do-you-know-an-autonomous-vehicle-has-seen-you/>, 2 pages.

* cited by examiner

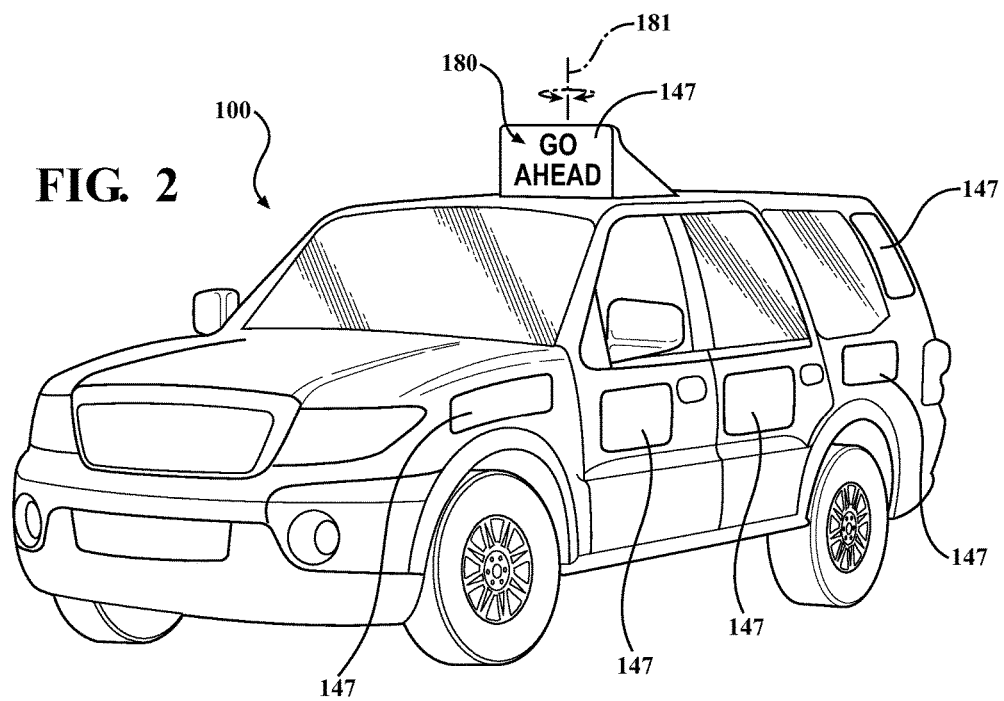
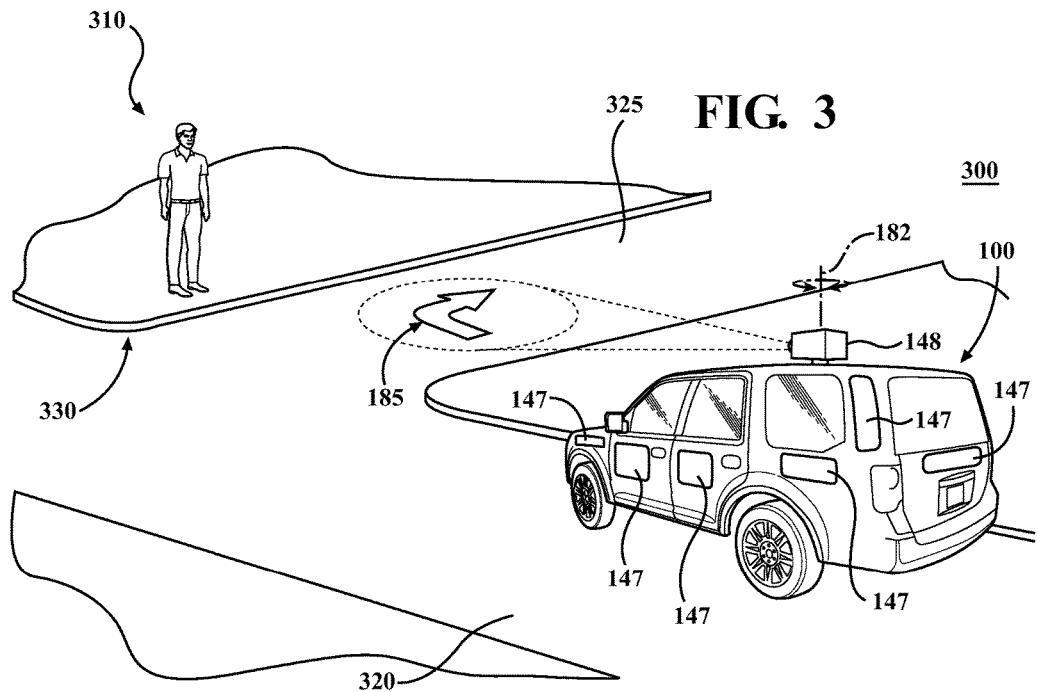

AUTONOMOUS VEHICLE INTERACTION WITH EXTERNAL ENVIRONMENT

FIELD

The subject matter described herein relates in general to vehicles having an autonomous operational mode and, more particularly, to the interaction of such vehicles with their external environment.

BACKGROUND

There are various ways in which a human driver of a vehicle can interact with the external environment of the vehicle. For instance, the driver may communicate with other human drivers or pedestrians using various non-verbal gestures. A driver may waive a hand or make some other type of hand gesture. A driver may nod his or her head. Such non-verbal gestures can be used to express different feelings, make a request or signal an intended action. For instance, a non-verbal gesture can be used to indicate the direction that the driver intends to proceed or to express the driver's willingness to allow another driver or a pedestrian to take an action before the driver. Similarly, other human drivers or pedestrians in the external environment may communicate with the driver of the vehicle using one or more non-verbal gestures. Such non-verbal gestures can be used to communication various things, such as indicating that the vehicle driver should go ahead with his or her next maneuver or requesting that the vehicle driver take a certain action.

SUMMARY

In one respect, the present disclosure is directed to a method of interaction between an autonomous vehicle and an external environment of the autonomous vehicle. The method can include detecting the external environment of the autonomous vehicle to identify a person therein. The method can also include locating the identified person. The method can further include determining whether the identified person is potentially related to a future driving maneuver of the autonomous vehicle. The method can include, responsive to determining that the person is potentially related to a future driving maneuver of the autonomous vehicle, causing the autonomous vehicle to send a directional message to the person.

In another respect, the present disclosure is directed to a system for interaction between an autonomous vehicle and an external environment of the autonomous vehicle. The system includes an autonomous vehicle. The autonomous vehicle can include a sensor system. The sensor can be operable to detect the external environment of the autonomous vehicle to identify a person therein. The sensor can be operable to locate the identified person.

The system can further include a processor located onboard the vehicle. The processor being programmed to initiate executable operations. The executable operations can include determining whether the identified person is potentially related to a future driving maneuver of the autonomous vehicle. The executable operations can include, responsive to determining that the person is potentially related to a future driving maneuver of the autonomous vehicle, causing the autonomous vehicle to send a directional message to the person.

In yet another respect, the present disclosure is directed to a computer program product for facilitating the interaction between an autonomous vehicle and an external environment of the autonomous vehicle. The computer program product includes a computer readable storage medium having program code embodied therewith. The program code is executable by a processor to perform a method. The method can include detecting the external environment of the autonomous vehicle to identify a person therein. The method can further include locating the identified person. The method can also include determining whether the identified person is potentially related to a future driving maneuver of the autonomous vehicle. The method can include, responsive to determining that the person is potentially related to a future driving maneuver of the autonomous vehicle, causing the autonomous vehicle to send a directional message to the person.

In another respect, the present disclosure is directed to a method of interaction between an autonomous vehicle and an external environment of the autonomous vehicle. The method can include detecting a non-verbal human gesture in the external environment. The method can also include identifying the detected non-verbal human gesture. The method can further include determining a future driving maneuver based at least in part on the identified non-verbal human gesture. The method can also include causing the autonomous vehicle to implement the determined future driving maneuver.

In a further respect, the present disclosure is directed to a system for interaction between an autonomous vehicle and an external environment of the autonomous vehicle. The system can include an autonomous vehicle. The autonomous vehicle can include a sensor system operable to detect a non-verbal gesture made by a person in the external environment.

The system can additionally include a processor. The processor is programmed to initiate executable operations. The executable operations can include identifying the detected non-verbal human gesture. The executable operations can also include determining a future driving maneuver based at least in part on the identified non-verbal human gesture. In addition, the executable operations can include causing the autonomous vehicle to implement the determined future driving maneuver.

In still another respect, the present disclosure is directed to a computer program product for interaction between an autonomous vehicle and an external environment of the autonomous vehicle. The computer program product includes a computer readable storage medium having program code embodied therewith. The program code is executable by a processor to perform a method. The method includes detecting a non-verbal human gesture in the external environment. The method also includes identifying the detected non-verbal human gesture. The method further includes determining a future driving maneuver based at least in part on the identified non-verbal human gesture. The method includes causing the autonomous vehicle to implement the determined future driving maneuver.

BRIEF DESCRIPTION OF THE DRAWINGS

FIG. 2 is an example of an autonomous vehicle configured for interaction with an external environment using a visual communication system, wherein the visual communication system includes a plurality of displays.

FIG. 3 is an example of an autonomous vehicle interacting with an external environment using a visual communication system, wherein the visual communication system includes a projector.

DETAILED DESCRIPTION

Figure 1:
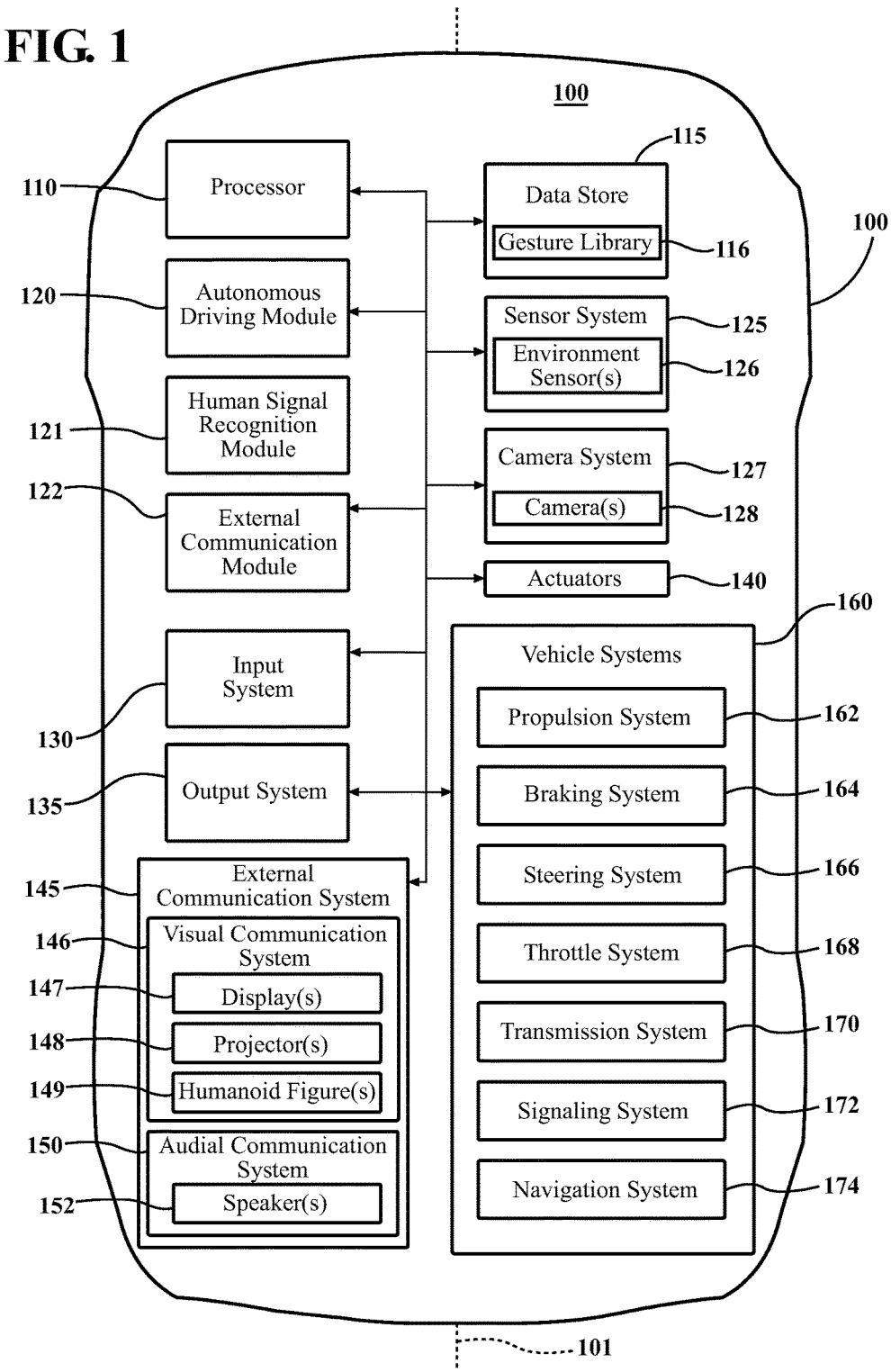
FIG. 1 is an example of an autonomous vehicle configured for interaction with an external environment.

This detailed description relates to the interaction between an autonomous vehicle and the environment external to the autonomous vehicle. More particularly, such interaction can include the autonomous vehicle communicating a directed message to one or more intended recipients in the external environment. Alternatively or in addition, such interaction can include the autonomous vehicle determining one or more future driving maneuvers based on, at least in part, one or more non-verbal human gestures detected in the external environment. The present detailed description relates to systems, methods and computer program products that incorporate such features. In at least some instances, such systems, methods and computer program products can improve safety and/or performance of an autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can have an associated longitudinal axis 101, which can be the central axis of the vehicle 100. The vehicle 100 can have an associated longitudinal direction. "Longitudinal direction" means any direction that is substantially parallel to and/or co-linear with the longitudinal axis 101.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit.

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement the various processes described herein. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 160). Alternatively or in addition, the data store 115 may contain such instructions.

The vehicle 100 can include a human signal recognition module 121. The human signal recognition module 121 can be implemented as computer readable program code that, when executed by a processor, implement the various processes described herein. The human signal recognition module 121 can be a component of the processor 110, or the human signal recognition module 121 can be executed on and/or distributed among other processing systems to which the processor 110 is operatively connected.

The human signal recognition module 121 can be configured to detect, identify, assess and/or interpret non-verbal human gestures to determine the meaning thereof. The human signal recognition module 121 may also be configured to detect, identify, assess and/or interpret verbal human gestures to determine the meaning thereof. The human signal recognition module 121 can include instructions (e.g., program logic) executable by the processor 110. Such instructions can include instructions to analyze non-verbal and/or verbal human gestures to determine the meaning thereof. Alternatively or in addition, the data store 115 may contain such instructions.

In one or more arrangements, the human signal recognition module 121 can be operatively connected to one or more gesture libraries 116. The one or more gesture libraries 116 can be included as part of one or more of the data stores 115. The gesture library 116 can include a set of predefined human gestures. "Gesture" is a form of non-verbal communication in which visible human bodily actions and/or movements are used to convey a message. A gesture may be used in place of or in conjunction with speech or other vocalization. Gestures include movement of the hands, fingers, arms, face, eyes, mouth and/or other parts of the body. A "predefined human gesture" is a human gesture that has an associated meaning. The term "set of predefined human gestures" means one or more predefined human gestures. The predefined human gestures in the gesture library 116 can have a meaning associated with it.

Identification of a non-verbal human gesture can be performed in any suitable manner. For instance, identification of a non-verbal human gesture can be performed using computer vision and/or image processing techniques. In one or more arrangements, the human signal recognition module 121 can be configured to compare a detected non-verbal human gesture to a set of predefined human gestures in the gesture library 116 to determine if there is a match. Match" or "matches" means that the captured non-verbal human gesture and one of the predefined human gestures in the set of predefined human gestures are identical. In some embodiments, "match" or "matches" can also mean that the detected human gesture and one of the predefined human gestures in the set of predefined human gestures are substantially identical. For instance, the detected human gesture and one of the predefined human gestures in the set of predefined human gestures can match within a predetermined probability (e.g., at least about 85%, at least about 90%, at least about 95% or greater) or confidence level.

The vehicle 100 can include an external communication module 122. The external communication module 122 can be implemented as computer readable program code that, when executed by a processor, implement the various processes described herein. The external communication module 122 can be a component of the processor 110, or the external communication module 122 can be executed on and/or distributed among other processing systems to which the processor 110 is operatively connected.

The external communication module 122 can be configured to determine an appropriate direction in which to send messages to one or more recipients (e.g. pedestrians or human drivers) in the external environment of the vehicle 100. Such messages can relate to, for example, future vehicle maneuvers. The external communication module 122 can include instructions (e.g., program logic) executable by the processor 110. Such instructions can include instructions to determine an appropriate manner of directional communication, such as visual communication and/or audial communication. Alternatively or in addition, the data store 115 may contain such instructions.

The vehicle 100 can include a sensor system 125. The sensor system 125 can include one or more sensors. "Sensor" means any device, component and/or system that can detect, determine, assess, measure, quantify and/or sense something. The one or more sensors can be configured to detect, determine, assess, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other or one or more of the sensors can work in combination with each other. The sensor system 125 and/or the one or more sensors can be operatively connected to the processor 110, the data store 115, the autonomous driving module 120 and/or other element of the vehicle 100.

The sensor system 125 can include any suitable type of sensor. For example, the sensor system 125 can include one or more sensors configured to detect, determine, assess, measure, quantify and/or sense information about the vehicle 100. Alternatively or in addition, the sensor system 125 can include one or more sensors configured to detect, determine, assess, measure, quantify and/or sense information about an environment in which the vehicle 100 is located, including information about objects in the environment. Such objects may be stationary object or moving objects. Alternatively or in addition to one or more of the above examples, the sensor system 125 can include one or more sensors configured to detect, determine, assess, measure, quantify and/or sense the location of the vehicle 100. Various examples of these and other types of sensors will be described herein. It will be understood that the embodiments are not limited to the particular sensors described.

The sensor system 125 can include one or more sensors configured to detect, determine, assess, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more environment sensors 126. The environment sensors 126 can be configured to detect, determine, assess, measure, quantify and/or sense objects in at least a portion of the environment surrounding the vehicle 100. Various examples of the environment sensors 126 will be described herein. However, it will be understood that the embodiments are not limited to the particular sensors described.

In one or more arrangements, one or more of the environment sensors 126 can use at least in part radio signals (e.g. RADAR based sensors). The one or more radio-based sensors can be configured to detect, determine, assess, measure, quantify and/or sense, directly or indirectly, the presence of one or more objects in the surrounding environment of the vehicle 100, the position of each detected object relative to the vehicle 100 and/or the distance between each detected object and the vehicle 100 in one or more directions (e.g. in the longitudinal direction, a lateral direction and/or other direction(s)).

In one or more arrangements, one or more of the environment sensors 126 can use at least in part lasers. For instance, one or more of the environment sensors 126 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, measure, quantify and/or sense, directly or indirectly, the presence of one or more objects in the surrounding environment of the vehicle 100, the position of each detected object relative to the vehicle 100 and/or the distance between each detected object and the vehicle 100 in one or more directions (e.g. in the longitudinal direction, a lateral direction and/or other direction(s)).

In one or more arrangements, one or more of the environment sensors 126 can use at least in part ultrasound. Such sensors can include an ultrasound source configured to emit ultrasonic signals and a detector configured to detect reflections of the ultrasonic signal. The one or more ultrasound-based environment sensors 126 can be configured to detect, determine, assess, measure, quantify and/or sense, directly or indirectly, the presence of one or more objects in the surrounding environment of the vehicle 100, the position of each detected object relative to the vehicle 100 and/or the distance between each detected object and the vehicle 100 in one or more directions (e.g. in the longitudinal direction, a lateral direction and/or other direction(s)). Such detecting can be based on a characteristic (e.g. the intensity) of a reflected ultrasonic signal.

In some arrangements, the sensor system 125, the processor 110, and/or one or more of the modules 120, 121, 122 can be configured to detect, determine, assess, measure, quantify and/or sense, directly or indirectly, one or more aspects, characteristics and/or properties of a detected object. For example, the sensor system 125, the processor 110, and/or one or more of the modules 120, 121, 122 can be configured to detect, determine, assess, measure, quantify and/or sense, directly or indirectly, the size, relative size, length, width, height, a dimension, the material and/or a material property of a detected object.

Alternatively or in addition to any of the sensors described above, the sensor system 125 can include other types of sensors. The sensor system 125, the processor 110, and/or one or more of the modules 120, 121, 122 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include a camera system 127. In one or more arrangements, the camera system 127 can be a part of the sensor system 125. The camera system 127 can include a one or more cameras 128. "Camera" is defined as any device, component, and/or system that can capture visual data. "Visual data" includes video and/or image information/data. The visual data can be in any suitable form.

In one or more arrangements, one or more of the cameras 128 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images.

In one or more arrangements, one or more of the cameras 128 can be externally facing. "Externally facing" means a camera that is oriented, positioned, configured, operable and/or arranged to capture visual data from at least a portion of the external environment of the vehicle 100. The one or more cameras 128 can be located in any suitable portion of the vehicle 100. For instance, one or more of the cameras 128 can be located within the vehicle 100. One or more of the cameras 128 can be located on the exterior of the vehicle 100. One or more of the cameras 128 can be located on or exposed to the exterior of the vehicle 100.

The position of one or more of the cameras 128 can be fixed such that its position does not change relative to the vehicle 100. One or more of the cameras 128 can be movable so that its position can change to allow visual data from different portions of the external environment of the vehicle 100 to be captured. The movement of such cameras 128 can be achieved in any suitable manner. For instance, the cameras 128 can be rotatable about one or more axes, pivotable, slidable and/or extendable, just to name a few possibilities. In one or more arrangements, the cameras 128 can have any suitable range of motion, including, for example, substantially spherical, substantially hemi-spherical, substantially circular and/or substantially linear.

One or more of the cameras 128 can be configured with zoom in and/or zoom out capabilities. For instance, one or more of the cameras 128 can be used to zoom in on one or more objects of interest in the exterior environment of the vehicle 100. For instance, when the object is a person (e.g. human pedestrian or driver), one or more of the cameras 128 can zoom in on at least a portion of the body of the person to capture visual data relating to a non-verbal gestures made by the person.

In some arrangements, one or more of the cameras 128 can zoom in on at least a portion of the body of the person to capture visual data relating to verbal gestures made by the person. For instance, one or more of the cameras 128 can zoom in on a person's mouth. "Verbal gesture" is a form of audible communication in which a person speaks or causes a sound to be made. Verbal gestures can include any word(s), phrase(s), sentence(s), utterance(s) made by a person. A verbal gesture may be used in conjunction with a non-verbal gesture.

The one or more cameras 128 and/or the movements of the one or more cameras 128 can be controlled by the camera system 127, the sensor system 125, the processor 110 and/or any one or more of the modules 120, 121, 122.

The human signal recognition module 121 and/or the processor 110 can be configured to analyze visual data captured by the camera system 127 to identify one or more non-verbal human gestures made by a person (e.g. a human pedestrian or driver) located in the external environment. A non-verbal human gesture can be identified in any suitable manner. For instance, as noted above, a captured non-verbal human gesture can be compared to a set of predefined human gestures in the gesture library 116 to determine if a captured non-verbal human gesture matches gesture in the set of predefined human gestures in the gesture library 116.

The vehicle 100 can include an input system 130 for receiving input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135 for presenting information to the driver or passenger. The output system 135 can include a display, as described above. Alternatively or in addition, the output system 135 may include a microphone, earphone and/or speaker. Some components of the vehicle 100 may serve as both a component of the input system 130 and a component of the output system 135.

The vehicle 100 can include one or more microphones (not shown). In one or more arrangements, the one or more microphones can be a part of the sensor system 125. "Microphone" is defined as any device, component, and/or system that can capture audial data. "Audial data" is any data/information that is perceptible to the human sense of hearing. The audial data can be in any suitable form. Audial data can include verbal gestures captured by the sensor system 125.

In one or more arrangements, one or more of the microphones can be externally facing. In this context, "externally facing" means a microphone that is oriented, positioned, configured, operable and/or arranged to capture audial data from at least a portion of the external environment of the vehicle 100. The one or more microphones can be located in any suitable portion of the vehicle 100. For instance, one or more of the microphones can be located within the vehicle 100. One or more of the microphones can be located on the exterior of the vehicle 100. One or more of the microphones can be located on or exposed to the exterior of the vehicle 100. When a plurality of microphones is provided, the microphones can be distributed about the vehicle 100 in any suitable manner. In some instances, a plurality of microphones can be provided in a microphone array.

The position of one or more of the microphones can be fixed such that its position does not change relative to the vehicle 100. One or more of the microphones can be movable so that its position can change to allow audial data from different portions of the external environment of the vehicle 100 to be captured. The movement of such microphones can be achieved in any suitable manner. For instance, the microphones can be rotatable about one or more axes, pivotable, slidable and/or extendable, just to name a few possibilities. In one or more arrangements, the microphones can have any suitable range of motion. The one or more microphones and/or the movements of the one or more microphones can be controlled by the sensor system 125, the processor 110 and/or any one or more of the modules 120, 121, 122.

The human signal recognition module 121 and/or the processor 110 can be configured to analyze audial data captured by the sensor system 125 (e.g. the microphones) and/or visual data captured by the sensor system 125 and/or the camera system 127 to identify one or more verbal gestures made by a person located in the external environment. For instance, the human signal recognition module 121 and/or the processor 110 can be configured to analyze visual data of lip movements to identify the words being spoken by a human in the external environment. As another example, the human signal recognition module 121 and/or the processor 110 can be configured to analyze audial data to identify the words being spoken by a human in the external environment and/or to identify sounds generated by a human in the external environment (e.g. honking of a horn of a vehicle). A verbal human gesture can be identified in any suitable manner. For instance, a captured verbal human gesture can be compared to a set of predefined human verbal gestures in a verbal gesture library or dictionary (not shown) to determine if a captured verbal human gesture matches a verbal human gesture in the set of predefined human verbal gestures in the library or dictionary.

In one or more arrangements, the human signal recognition module 121 can be operatively connected to one or more verbal libraries or dictionaries. The one or more verbal libraries or dictionaries can be included as part of one or more of the data stores 115. The verbal libraries or dictionaries can include a set of predefined human verbal gestures.

In one or more arrangements, the human signal recognition module 121 can include voice recognition technologies to analyze, asses, identify and/or interpret audial data acquired from the external environment. The human signal recognition module 121 can include any suitable hardware and/or software for voice recognition.

The vehicle 100 can include an external communication system 145. "External communication system" means one or more elements, one or more devices, one or more components, one or more systems and/or combinations thereof configured to communicate with one or more intended recipients in the external environment of the vehicle 100. More particularly, "external communication system" means one or more elements, one or more devices, one or more components, one or more systems and/or combinations thereof configured to send directional communications to one or more intended recipients in the external environment of the vehicle 100. "Directional communications" means one or more messages sent to a portion of the external environment that includes the detected location of an intended recipient of the message. The message can be in any suitable form, including visual and/or audial form.

The message can be any suitable type of message. For instance, the message can relate to future driving maneuvers of the vehicle 100. Examples of future driving maneuvers include, for example, turning right, turning left, stopping, continuing straight, passing, or making a u-turn, just to name a few possibilities. Future driving maneuvers can also include instructions, indications, requests or offers. As an example, the future driving maneuvers can include allowing a pedestrian to cross a road before the vehicle 100 turns onto the road.

The processor 110 and/or the autonomous driving module 120 may be operable to control the external communication system 145. For instance, when operating in an autonomous mode, the processor 110 and/or any one or more of the modules 120, 121, 122 can be operable to cause the external communication system 145 to communicate with one or more intended recipients in the external environment of the vehicle 100, such as by sending a directional message.

The external communication system 145 includes a visual communication system 146 and/or an audial communication system 150. "Visual communication system" means one or more elements, one or more devices, one or more components, one or more systems and/or any combination thereof configured to present a directional visual messages to one or more intended recipients located in the external environment of an autonomous vehicle. "Visual message" is any communication that is perceptible to the human sense of sight. "Directional visual message" means a visual message that is sent to a portion of the external environment of a vehicle in a direction that is substantially aligned with the location of an intended recipient in the external environment. The "recipient" can be a person in the external environment. The recipient can be for example, a human pedestrian, a human bicyclist and/or a human driver or occupant of another vehicle in the environment.

The visual message can be a textual representation and/or a graphical representation. In one or more arrangements, the textual representation of the visual message can be relatively short and/or relatively simple. Examples of such textual representations include: "I See You," "Go Ahead," "Turning Right," "Turning Right" and "Stopping." Likewise, the graphical representation of the visual message can be relatively simple. For instance, the graphical representation can be an arrow to indicate the direction of a future turn of the vehicle 100. As another example, the graphical representation can be a red stop sign to indicate that the vehicle 100 is stopping. In some arrangements, the visual message can include both textual and graphical representations.

In one or more arrangements, the visual communication system 146 can include one or more displays 147, one or more projectors 148 and/or one or more humanoid figures 149. Each of these examples of the visual communication system 146 will be described in turn below. The one or more displays 147, one or more projectors 148 and/or one or more humanoid figures 149 can be controlled at least in part by the processor 110, the autonomous driving module 120, the human signal recognition module 121 and/or the external communication module 122.

In one or more arrangements, the visual communication system 146 can include one or more displays 147. "Display" is defined as a component or a group of components that present visual data. The display 147 can be any suitable type of display. For instance, the display 147 can be a liquid crystal display (LCD), a light emitting diode (LED) display or some other suitable display. In one or more arrangements, the one or more displays can have or be set to have high contrast output so that a visual message presented on the display 147 can be seen by an intended recipient in a wide range of ambient lighting conditions. For instance, the contrast output of the displays 147 can be set so that the visual message presented thereon can be seen by an intended recipient during a sunny day.

The one or more displays 147 can be externally facing displays. "Externally facing display" means a display that is oriented, positioned, configured, operable and/or arranged to present visual data to one or more recipients located in the external environment of an autonomous vehicle. The one or more displays 147 can be located in any suitable portion of the vehicle 100. For instance, one or more of the displays 147 can be located within the vehicle 100. One or more of the displays 147 can be located on the exterior of the vehicle 100. One or more of the displays 147 can be exposed to the exterior of the vehicle 100. For instance, the displays 147 can be provided on a door, fender, panel, hood, trunk, roof, wing mirror and/or other portion of the exterior of the vehicle 100. A plurality of displays 147 can be provided, and the plurality of displays 147 can be distributed about the vehicle 100 in any suitable manner.

The position of one or more of the displays 147 can be fixed such that its position does not change relative to the vehicle 100. One or more of the displays 147 can be movable so that its position can change to allow visual data to be selectively presented to different portions of the external environment of the vehicle 100. The movement of such displays 147 can be achieved in any suitable manner. For instance, the displays 147 can be rotatable about one or more axes, pivotable, slidable and/or extendable, just to name a few possibilities. In one or more arrangements, the displays 147 can have any suitable range of motion, including, for example, substantially spherical, substantially hemi-spherical, substantially circular and/or substantially linear.

FIGS. 2 and 3 show arrangements in which a plurality of displays 147 are integrated into various body panels of the vehicle 100. FIG. 2 also shows an arrangement in which a display 147 can be provided on the roof of the vehicle 100. The display can be rotatable about an axis 181 in any suitable manner. Alternatively or in addition, the display 147 can be movable between a deployed position (as shown in FIG. 2) and a stowed position in any suitable manner.

In one or more arrangements, the visual communication system 146 can include one or more projectors 148. "Projector" is defined as a component or a group of components that can project visual data onto a surface. In one or more arrangements, the projector 148 can project visual data (e.g. a light, an image and/or a video) onto a surface in the exterior environment of the vehicle 100. The surface can be a paved surface, a portion of a structure, and/or a sign, just to name a few possibilities. In one or more arrangements, the projector 148 can be a laser or other light emitting element, device, component and/or system. The projector 148 may emit light at any suitable wavelength on the electromagnetic spectrum.

The one or more projectors 148 can be located in any suitable portion of the vehicle 100. For instance, one or more of the projectors 148 can be located within the vehicle 100. One or more of the projectors 148 can be located on the exterior of the vehicle 100. One or more of the projectors 148 can be exposed to the exterior of the vehicle 100. One or more of the projectors 148 can be provided on a door, fender, panel, hood, trunk, roof, wing mirror and/or other portion of the exterior of the vehicle 100. A plurality of projectors 148 can be provided, and the plurality of projectors 148 can be distributed about the vehicle 100 in any suitable manner.

The position of one or more of the projectors 148 can be fixed such that its position does not change relative to the vehicle 100. One or more of the projectors 148 can be movable so that its position can change to allow visual data to be presented to different portion of the external environment of the vehicle 100. The movement of such projectors 148 can be achieved in any suitable manner. For instance, the projectors 148 can be rotatable about one or more axes, pivotable, slidable and/or extendable, just to name a few possibilities. In one or more arrangements, the projectors 148 can have any suitable range of motion, including, for example, substantially spherical, substantially hemi-spherical, substantially circular and/or substantially linear.

FIG. 3 shows an arrangement in which a projector 148 is provided on the roof of the vehicle 100. The projector 148 can be rotatable about an axis (e.g. axis 182) in any suitable manner. Alternatively or in addition, the projector 148 can be movable between a deployed position and a stowed position in any suitable manner. The projector 148 can be selectively moved to send a visual message to a recipient (e.g., person 310) in the external environment 300. In the example shown in FIG. 3, the visual message can be an image 185 (e.g. arrow) indicating a right hand turn.

Figure 4:
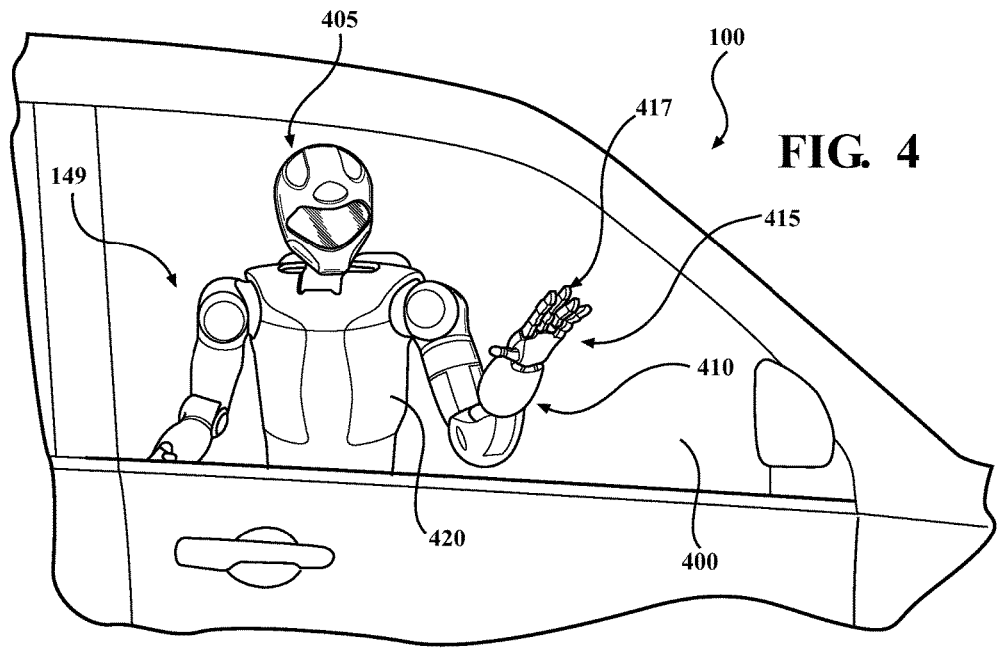
FIG. 4 is an example of an autonomous vehicle configured for interaction with an external environment using a visual communication system, wherein the visual communication system includes a humanoid robotic figure.

In one or more arrangements, the visual communication system 146 can include one or more humanoid figures 149. "Humanoid figure" is defined as a controllable object that resembles at least a portion of the body of a human being. For instance, the humanoid figure 149 can resemble an entire human being, the body of a human being from the waist up, the body of a human being from the chest up, a hand, an arm, and/or a head. In one or more arrangements, the humanoid figure 149 can be lifelike, natural and/or realistic in appearance. In one or more arrangements, the humanoid figure 149 can be artificial, unnatural, and/or unrealistic in appearance. The humanoid figure 149 can be anatomically correct, or it can be anatomically incorrect. In one or more arrangements, the humanoid figure 149 may generally resemble a human being. For instance, FIG. 4 shows an arrangement in which the humanoid figure 149 does not have the appearance of a human being, but it has various features associated with human beings (e.g. a head 405, an arm 410, a hand 415 and/or one or more fingers 417).

In one or more arrangements, the humanoid figure 149 can be at least partially mechanical or electro-mechanical. In one or more arrangements, the humanoid figure 149 can be a robot. In one or more arrangements, the humanoid figure 149 can be a controllable mannequin. In one or more arrangements, the humanoid figure 149 can be a controllable toy.

The one or more humanoid figures 149 can be configured to substantially mimic one or more human gestures or movements or to gesture in a manner consistent with human action. For instance, one or more humanoid figures 149 can be configured to wave a hand, point one or more fingers, make a sign with the fingers (e.g. OK sign, thumbs up sign, stop sign, etc.), and/or nod a head, just to name a few possibilities. One or more humanoid figures 149 can be fully articulated to provide a desired gesture or movement.

The one or more humanoid figures 149 can be located in any suitable portion of the vehicle 100 so that it can be viewed by one or more recipients in the external environment of the vehicle 100. One or more humanoid figures 149 can be located within the vehicle 100. As an example, one or more humanoid figures 149 can be located in a front passenger compartment of the vehicle 100. One or more humanoid figures 149 can be located on the exterior of the vehicle 100. One or more of the humanoid figures 149 can be provided on a door, fender, panel, hood, trunk, roof, wing mirror and/or other portion of the exterior of the vehicle 100.

FIG. 4 shows an arrangement in which a humanoid figure 149 is provided in a front passenger area 400 of the vehicle 100. In one or more arrangements, an upper body portion 420 of the humanoid figure 149 can be movable (e.g. rotatable about an axis) to face an appropriate side of the vehicle 100. Alternatively or in addition, the humanoid figure 149 can be controlled to move a head 405, an arm 410, a hand 415 and/or one or more fingers 417 to send a visual message. For instance, the humanoid figure 149 in FIG. 4 is waiving a hand. In one or more arrangements, a window of the vehicle 100 can be opened to allow a recipient in the external environment to better see the humanoid figure 149.

As noted above, the external communication system 145 can include an audial communication system 150. "Audial communication system" means one or more elements, one or more devices, one or more components, one or more systems, and/or any combination thereof configured to present a directional audial message to one or more intended recipients (e.g. human pedestrian and/or human driver) located in the external environment of an autonomous vehicle. "Audial message" is any communication that is perceptible to the human sense of hearing.

In one or more arrangements, the audial message can be relatively short and/or relatively simple. Examples of such textual representations include: "I See You," "Go Ahead," "Turning Right," "Turning Right" and "Stopping." In one or more arrangements, the audial message can be a sound or a group of sounds that may not form words.

The audial communication system 150 can include one or more speakers 152. "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker can have one or more audio output channels (not shown) operatively connected thereto. "Audio output channel" means any suitable device, component or structure for carrying audio signals.

In one or more arrangements, the one or more speakers can be configured as directional sound speakers. "Directional sound" refers to speakers configured to create fields of sound which spread less than conventional speakers. The use of such speakers can be beneficial in that the audial message is conveyed more directly to the intended recipient(s) while reducing the number of unintended recipients who might receive the audial message.

The one or more speakers can be oriented, positioned, configured, operable and/or arranged to present audial data to one or more recipients located in the external environment of an autonomous vehicle. The one or more speakers 152 can be located in any suitable portion of the vehicle 100. For instance, one or more of the speakers 152 can be located within the vehicle 100. One or more of the speakers 152 can be located on the exterior of the vehicle 100. One or more of the speakers 152 can be exposed to the exterior of the vehicle 100. For instance, the speakers 152 can be provided on a door, fender, panel, hood, trunk, roof, wing mirror and/or other portion of the exterior of the vehicle 100. A plurality of speakers 152 can be provided, and the plurality of speakers 152 can be distributed about the vehicle 100 in any suitable manner.

The position of one or more of the speakers 152 can be fixed such that its position does not change relative to the vehicle 100. One or more of the speakers 152 can be movable so that its position can change to allow audial data to be selectively presented to different portions of the external environment of the vehicle 100. The movement of such speakers 152 can be achieved in any suitable manner. For instance, the speakers 152 can be rotatable about one or more axes, pivotable, slidable and/or extendable, just to name a few possibilities. In one or more arrangements, the speakers 152 can have any suitable range of motion, including, for example, substantially spherical, substantially hemispherical, substantially circular and/or substantially linear.

Figure 5:
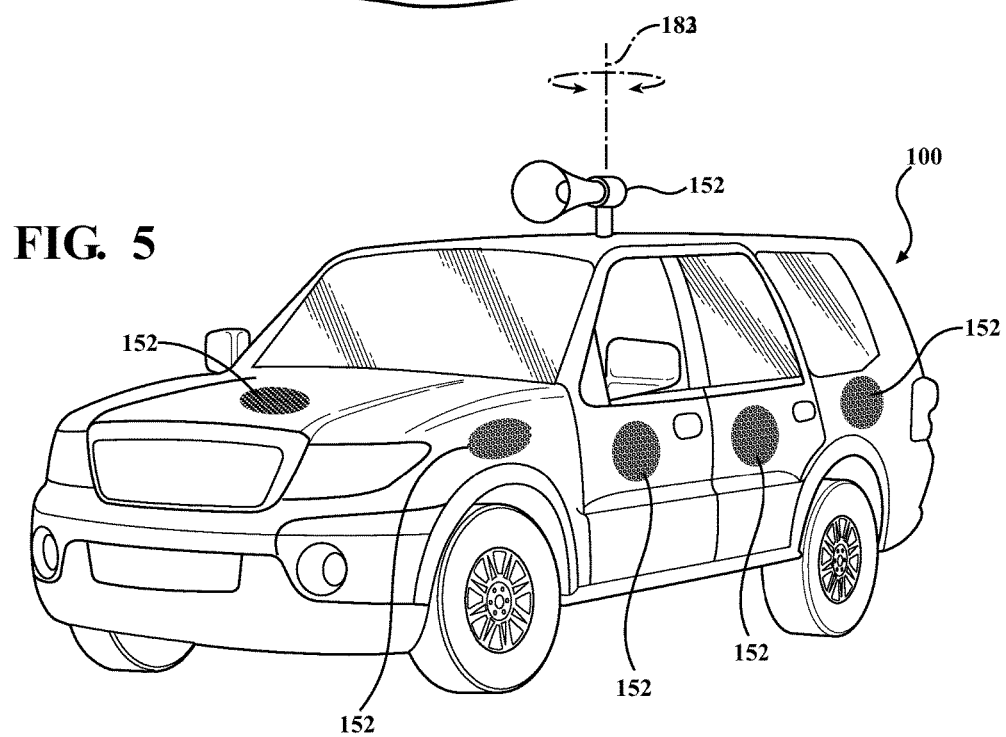
FIG. 5 is an example of an autonomous vehicle configured for interaction with an external environment using an audial communication system, wherein the audial communication system includes a plurality of speakers.

FIG. 5 shows arrangements in which a plurality of speakers 152 are integrated into various body panels of the vehicle 100. FIG. 5 also shows an arrangement in which a speaker 152 can be provided on the roof of the vehicle 100. In one or more arrangements, such a speaker 152 can be rotatable about one or more axes (e.g. axis 181) in any suitable manner.

The vehicle 100 can include one or more vehicle systems 160. Various examples of the one or more vehicle systems 160 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 162. The propulsion system 162 can include one or more mechanisms, devices, elements, components, systems, and/or combinations thereof, now known or later developed, configured to provide powered motion for the vehicle 100. The propulsion system 162 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 164. The braking system 164 can include one or more mechanisms, devices, elements, components, systems, and/or combinations thereof, now known or later developed, configured to decelerate the vehicle 100. As an example, the braking system 164 can use friction to slow the wheels/tires. The braking system 164 can convert the kinetic energy of the wheels/tires to electric current.

Further, the vehicle 100 can include a steering system 166. The steering system 166 can include one or more mechanisms, devices, elements, components, systems, and/or combinations thereof, now known or later developed, configured to adjust the heading of the vehicle 100.

The vehicle 100 can include a throttle system 168. The throttle system 168 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 172. The signaling system 172 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 172 can provide information regarding the vehicle's presence, position, size, direction of travel, and/or the driver's intentions regarding direction and speed of travel. For instance, the signaling system 172 can include headlights, taillights, brake lights, hazard lights and turn signal lights.

The vehicle 100 can include a navigation system 174. The navigation system 174 can include one or more mechanisms, devices, elements, components, systems, applications and/or combinations thereof, now known or later developed, configured to determine the geographic location of the vehicle 100 and/or to determine a travel route for the vehicle 100.

The navigation system 174 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 174 can be configured to update the travel route dynamically while the vehicle 100 is in operation.

The navigation system 174 can include a global positioning system, a local positioning system or a geolocation system. The navigation system 174 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 174 can use Transmission Control Protocol (TCP) and/or a Geographic information system (GIS) and location services.

The navigation system 174 may include a transceiver configured to estimate a position of the vehicle 100 with respect to the Earth. For example, navigation system 174 can include a GPS transceiver to determine the vehicle's latitude, longitude and/or altitude. The navigation system 174 can use other systems (e.g. laser-based localization systems, inertial-aided GPS, and/or camera-based localization) to determine the location of the vehicle 100.

Alternatively or in addition, the navigation system 174 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 160 and/or individual components thereof. For example, returning to FIG. 1, the processor 110 and/or the autonomous driving module 120 can be in communication to send and/or receive information from the various vehicle systems 160 to control the movement, speed, maneuvering, heading, direction, etc. of vehicle 100. The processor 110 and/or the autonomous driving module 120 may control some or all of these vehicle systems 160 and, thus, may be partially or fully autonomous.

The processor 110 and/or the autonomous driving module 120 may be operable to control the navigation and/or maneuvering of the vehicle 100 by controlling one or more of the vehicle systems 160 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 160 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

According to arrangements described herein, the vehicle 100 can be configured for interaction between the vehicle 100 and the environment external to the vehicle 100. In one or more arrangements, the vehicle 100 can be configured so that at least a portion of the external communication system 145 can be activated to send a directional communication to a human recipient in the surrounding environment. In one or more arrangements, the vehicle 100 can be configured to detect and recognize non-verbal human signals in the environment and determine a driving action in response.

Figure 6:
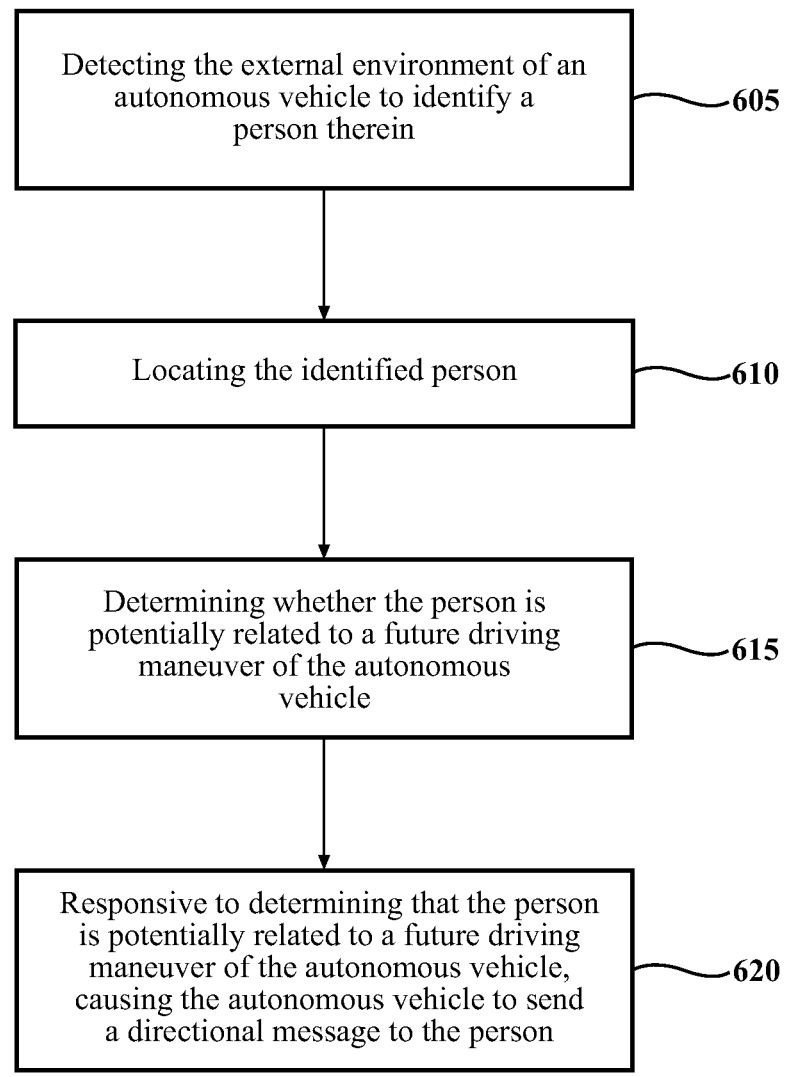
FIG. 6 is an example of a method of interacting with an environment external for an autonomous vehicle, wherein the autonomous vehicle sends a directional message to a portion of the external environment.

Now that the various potential systems, devices, elements and/or components of the vehicle 100 have been described, various methods for interaction between an autonomous vehicle and the environment external to the autonomous vehicle will now be described. Referring now to FIG. 6, an example of a method of interacting with an external environment for an autonomous vehicle is shown. Various possible steps of method 600 will now be described. The method 600 illustrated in FIG. 6 may be applicable to the embodiments described above in relation to FIGS. 1-5, but it is understood that the method 600 can be carried out with other suitable systems and arrangements. Moreover, the method 600 may include other steps that are not shown here, and in fact, the method 600 is not limited to including every step shown in FIG. 6. The steps that are illustrated here as part of the method 600 are not limited to this particular chronological order. Indeed, some of the steps may be performed in a different order than what is shown and/or at least some of the steps shown can occur simultaneously.

At block 605, the external environment of the vehicle 100 can be detected to identify one or more persons in the external environment. "Identify one or more persons" means that a detected object is identified as being a human being. The detecting of the external environment can be performed by one or more sensors of the sensor system 125, such as the environment sensor(s) 126, and/or by the camera system 127. In some arrangements, the detecting of the external environment can be performed continuously or at any suitable interval. The detecting and/or identifying of persons can be performed in any suitable manner, such as by using one or more human recognition technologies. Examples of human recognition technologies include facial recognition (e.g. face detection and/or face localization), body recognition and/or iris recognition. A human can be recognized by computer vision, template matching or other visual data processing technology now known or later developed.

In one or more arrangements, a person can be presumed to be present without directly detecting or identifying a person. For instance, the vehicle 100 may presume that another vehicle has a human driver if it is detected that the other vehicle is not an autonomous vehicle or that the vehicle is operating in a manual mode. For instance, the vehicle 100 may send a request to the other vehicle, inquiring into the operational mode of the other vehicle. If a response is not received (e.g. within a predetermined amount of time or otherwise), it can be presumed that the vehicle has a human driver. Further, if a response is received indicating that the vehicle is operating in a manual mode, then it can be presumed that the vehicle has a human driver.

If one or more persons are detected in the external environment, the method 600 can continue to block 610. If no persons are detected in the external environment, the method 600 can return to block 605, or the method 600 can end.

At block 610, a detected person can be located relative to the vehicle 100. The locating of a person relative to the vehicle 100 can be performed in any suitable manner. As an example, the locating can be performed by one or more sensors of the sensor system 125, such as the environment sensor(s) 126. The locating of a person can be performed continuously or at any suitable interval. The method can continue to block 615.

At block 615, it can be determined whether the detected person(s) are potentially related to a future driving maneuver of the vehicle 100. "Potentially related to a future driving maneuver" means that the person is located or is moving in a direction (and/or at a speed) that would cause the vehicle and the person to be substantially close to each other based on the current travel route of the vehicle 100 (e.g. current location, future driving maneuvers and/or current or future vehicle speed). "Substantially close" means that the vehicle and the person would impinge upon each other and/or would be located within a predetermined safety distance of each other. The predetermined safety distance can be any suitable value, including, for example, about 20 feet or less, about 15 feet or less, about 10 feet or less, about 5 feet or less, or about 2 feet or less.

If it is determined that the person is not potentially related to a future driving maneuver, the method 600 can return to block 605, or the method 600 can end. For instance, if a person is located or will be located outside of the predetermined safety distance, then the person can be ignored or otherwise filtered and thus effectively ignored. If a person is determined to be potentially related to a future driving maneuver, the method 600 can continue to block 620.

At block 620, responsive to determining that the person is potentially related to a future driving maneuver, the vehicle 100 can be caused to send a directional message to the person. The directional message can be a visual message and/or an audial message. The method 600 can end, or the method 600 can return to block 605.

A non-limiting example of the method 600 will be described in relation to FIG. 3. For purposes of this example, the vehicle 100 can be traveling along a first street 320. The travel route of the vehicle can include turning right on a second street 325 that is transverse to the first street 320. A person 310 can be located at a corner 330 of the first street 320 and the second street 325. The person 310 can be waiting to cross the second street 325.

The vehicle 100 can detect the external environment 300. The vehicle 100 can detect the presence of the person 310. The vehicle 100 can identify the person 310 as being a person in any suitable manner, such as by using any suitable human recognition technology (e.g. facial recognition). The person 310 can be located relative to the vehicle 100.

The vehicle 100 can determine whether the person 310 is potentially related to a future driving maneuver of the vehicle 100. In this example, the future driving maneuver is a right turn onto the second street 325. Based on this future driving maneuver and the location of the person 310, it can be determined that the person 310 is potentially related to a future driving maneuver of the vehicle 100. Such a determination can be made based on the person 310 being located within a predetermined safety distance from the vehicle 100. Alternatively or in addition, such a determination can be made because the vehicle 100 can recognize that the person 310 is waiting to cross a street (e.g. the second street 325) that the vehicle 100 will turn onto in a future driving maneuver. Alternatively or in addition, such a determination can be made based on a verbal gesture and/or a non-verbal human gesture received from a person in the external environment. For instance, the person 310 may say "go ahead" or "proceed" and/or make such a hand gesture.

The vehicle 100 can be caused, such as by the processor 110 and/or the external communication module 122, to send a directional message to the person 310. The directional message can have any suitable form. For instance, the directional message can be a visual message. In the example shown in FIG. 3, the visual message can be an image 185 projected onto a surface in the external environment 300 in a location that is in the general location of the person 310. For instance, the image 185 can be projected onto a portion of the second street 325 that the person 310 will cross or near a portion of the second street 325 that the person 310 will cross. As such, the person 310 can be apprised of a future driving maneuver of the vehicle 100, and the person 310 can take action accordingly.

In one or more arrangements, a projector 148 can be activated to present the image 185. The projector 148 can be movable so that the image 185 is projected onto a surface in a suitable location. For instance, the projector 148 can be rotatable about the axis 182. Alternatively or in addition, the projector 148 can be movable along the axis 182. Still alternatively or in addition, the projector 148 can be pivoted relative to the axis 182 or other suitable point. The movement of the projector 148 can be controlled in any suitable manner, such as by the external communication module 122 and/or the processor 110.

Alternatively or in addition, the visual message can be conveyed to the person 310 on one or more of the displays 147. The one or more displays 147 can be used to send a directional message in various ways. For instance, one or more of the displays 147 can be selectively activated to present a visual message to the person 310. The display(s) 147 can be selected based on the location of the person 310. Thus, in the arrangement shown in FIG. 2, a display on the front facing portion of the vehicle 100 can be selected.

Alternatively or in addition, a movable display can be activated to present the visual message. For instance, as is shown in FIG. 2, the vehicle 100 can include a movable display 147 mounted on the roof of the vehicle 100. The display 147 can be movable so that an image on the display 147 is viewable by the person 310. For instance, the display 147 can be rotatable about the axis 181. Alternatively or in addition, the display 147 can be movable along the axis 181. Still alternatively or in addition, the display 147 can be pivoted relative to the axis 181 or other suitable point. The movement of the display 147 can be controlled in any suitable manner, such as by the external communication module 122 and/or the processor 110.

The visual message can be a graphical representation of a future driving maneuver. In the scenario presented in FIG. 2, the graphical representation of a future driving maneuver can be a right turn arrow, such the one shown in image 185. Alternatively or in addition, the visual image presented on the display can be a textual representation of a future driving maneuver. For instance, the text "Turning Right" can be presented on one or more of the displays 147 or projected onto a surface.

Alternatively or in addition to a visual message, the directional message can be an audial message. As such, the person 310 can be audibly apprised of a future driving maneuver of the vehicle 100, and the person 310 can take action accordingly.

In one or more arrangements, the audial message can be sent to the person 310 on one or more of speakers 152 (FIG. 5). The one or more speakers 152 can be used to send a directional message in various ways. For instance, one or more of the speakers 152 can be selectively activated to send an audial message to the person 310. The speaker(s) 152 can be selected based on the location of the person 310. Thus, in the scenario shown in FIG. 2, a display located in a front facing portion of the vehicle 100 may be selected. In the scenario presented in FIG. 3, the audial message can be "Turning right."

Alternatively or in addition, a movable speaker can be activated to present the directional audial message. For instance, as is shown in FIG. 5, the vehicle 100 can include a movable speaker 152 mounted on the roof of the vehicle 100. The speaker 152 can be movable so that sound is emitted from the speaker 152 in the general direction of the person 310. For instance, the speaker 152 can be rotatable about the axis 183. Alternatively or in addition, the speaker 152 can be movable along the axis 183. Still alternatively or in addition, the speaker 152 can be pivoted relative to the axis 183 or other suitable point. The movement of the speaker 152 can be controlled in any suitable manner, such as by the external communication module 122 and/or the processor 110.

In another variation, the vehicle 100 may determine to allow the person 310 to cross the second street 325 before the vehicle 100 makes a right hand turn onto the second street 325. In such case, the vehicle 100 can be caused to reduce its speed and/or the humanoid figure 149 can be activated to send a directional visual message to the person 310. For example, the humanoid figure 149 can be caused to waive its hand 415 and/or fingers 417 to indicate that the person 310 may cross the second street 325.

Another non-limiting example of the method 600 will now be described. In this example, the vehicle 100 can be traveling in a first direction on a road behind a forward vehicle. The road may have only one travel lane in the first direction.

The vehicle 100 can detect the presence of the forward vehicle in the external environment. The vehicle 100 can determine that the forward vehicle is being driven by a person in any suitable manner. The forward vehicle can be located relative to the vehicle 100.

The forward vehicle may be traveling at a slow speed (e.g. below the posted speed limit). The vehicle 100 can determine that the forward vehicle/person is potentially related to a future driving maneuver of the vehicle 100. In this example, the future driving maneuver can be continuing to drive along the current road at the posted speed limit. Based on this future driving maneuver, the distance between the vehicle 100 and the forward vehicle, the speed of the forward vehicle, and/or the relative speeds of the vehicle 100 and the forward vehicle, it can be determined that the forward vehicle is potentially related to a future driving maneuver of the vehicle 100. For example, the determination can be made based on the fact that the vehicle 100 would impinge upon the forward vehicle if the vehicle 100 were to continue at the posted speed limit.

One or more displays 147 of the vehicle 100 can be activated to send a visual message to the human driver of the forward vehicle. For instance, a display 147 can be activated so that it can be visible in a rearview mirror and/or a wing mirror of the forward vehicle. Thus, the visual message can be "In a rush, please speed up" or "please allow passing." Alternatively or in addition, one or more speakers 152 can be activated to send an audial message to the human driver of the forward vehicle.

Figure 7:
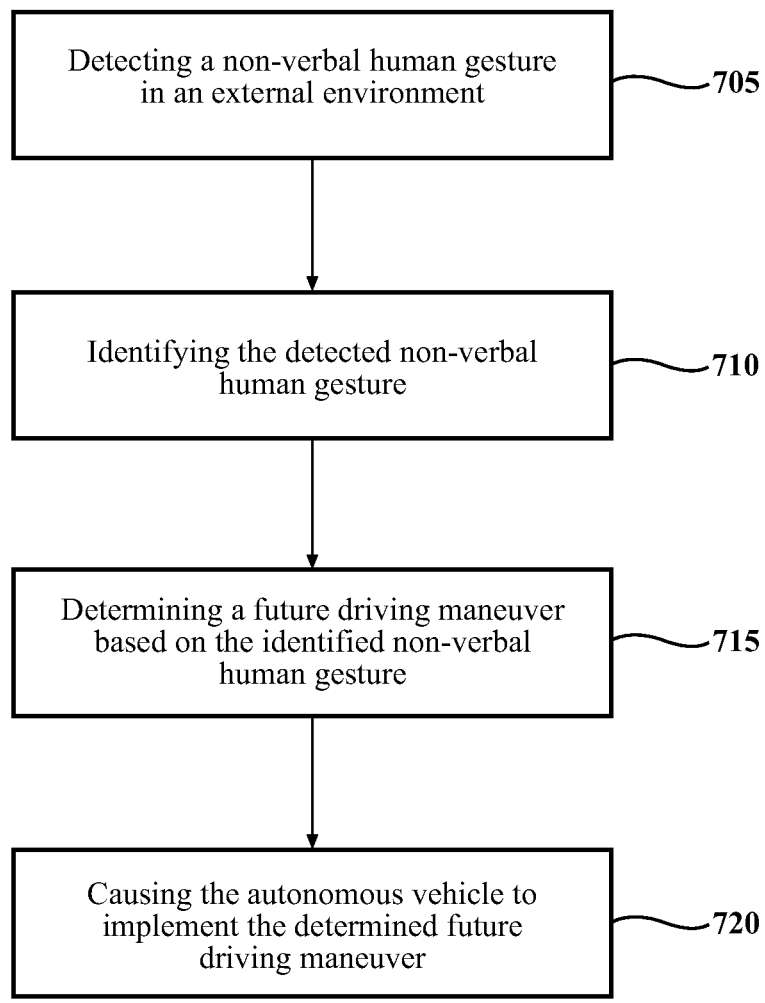
FIG. 7 is an example of a method of interacting with an environment external for an autonomous vehicle, wherein the autonomous vehicle determines a future driving maneuver based at least partially on a non-verbal human gesture detected in the external environment.

Referring now to FIG. 7, an example of a method 700 of interacting with an environment external for an autonomous vehicle is shown. Various possible steps of method 700 will now be described. The method 700 illustrated in FIG. 7 may be applicable to one or more of the arrangements described above, but it is understood that the method 700 can be carried out with other suitable systems and arrangements. Moreover, the method 700 may include other steps that are not shown here, and in fact, the method 700 is not limited to including every step shown in FIG. 7. The steps that are illustrated here as part of the method 700 are not limited to this particular chronological order. Indeed, some of the steps may be performed in a different order than what is shown and/or at least some of the steps shown can occur simultaneously.

At block 705, a non-verbal human gesture in the external environment can be detected. Such detection can be performed in any suitable manner. The detecting of the external environment can be performed by one or more sensors of the sensor system 125, such as the environment sensor(s) 126, and/or by the camera system 127. In some arrangements, the detecting of the external environment can be performed continuously or at any suitable interval. The detecting of the non-verbal human gesture can be performed in any suitable manner, such as by the human signal recognition module 121. The detecting of non-verbal human gestures can be made using any suitable detection technology, such as computer vision, template matching or other visual data processing technology now known or later developed.

The non-verbal human gesture can be made by a pedestrian or human driver of another vehicle in the external environment. In one or more arrangements, the non-verbal human gesture can be made by a human in the external environment who is not controlling the vehicle 100.

If a non-verbal human gesture is not detected in the external environment, the method 700 can return to block 705, or the method 700 can end. If a non-verbal human gesture is detected in the external environment, the method 700 can continue to block 710.

At block 710, the detected non-verbal human gesture can be identified. Such identifying can be performed in any suitable manner. For instance, the detected non-verbal human gesture can be compared to a set of predefined non-verbal human gestures. If the detected non-verbal human gesture does not match one of the set of the predefined non-verbal human gesture, the method 700 can end or return to block 705. If, however, the detected non-verbal human gesture matches one of the set of predefined non-verbal human gestures, then the method 700 can continue to block 715. The identification of the non-verbal human gesture can be performed by the processor and/or the human signal recognition module 121.

At block 715, a future driving maneuver can be determined based on the identified non-verbal human gesture. In one or more arrangements, such a determination can be based entirely on the identified non-verbal human gesture. In one or more arrangements, such a determination can be based on the identified non-verbal human gesture and one or more other factors. One example of another factor that the determination can be based on is a detected and/or identified verbal human gesture. Any suitable future driving maneuver can be determined. In one or more arrangements, the future driving maneuver can be a continuation of a previously intended future driving maneuver. In one or more arrangements, the future driving maneuver can be a modification of a previously intended future driving maneuver. In one or more arrangements, the future driving maneuver can be an entirely new driving maneuver that was not previously intended.

At block 720, the vehicle 100 can be caused to implement the determined future driving maneuver. For instance, the processor 110 and/or the autonomous driving module 120 can be operatively connected to one or more of the vehicle systems 160 to implement the determined future driving maneuver. In one or more arrangements, the processor 110 and/or the autonomous driving module 120 can be operable to control the one or more actuators 140, which can control one or more of the vehicle systems 160 or portions thereof to implement the determined future driving maneuver.

While not shown in FIG. 7, it will be understood that, in some arrangements, the method 700 can include detecting and/or identifying verbal human gestures in the external environment. The above descriptions of blocks 705 and 710 can apply at least in part to the detection and identification of verbal human gestures, respectively. In arrangements in which a verbal human gesture is detected and/or identified, such actions can occur at any time and in any order with respect to the detection and/or identification of non-verbal human gestures described above in connection with blocks 705 and 710, including before, after or simultaneously.

The identified verbal human gesture can be used to confirm an identified non-verbal human gesture, thereby increasing the confidence of the determination of the meaning of a non-verbal human gesture. Alternatively or in addition, the identified verbal human gesture can, in one or more arrangements, be used in combination with the identified non-verbal human gesture to determine the future driving maneuver at block 715.

It should be noted that, while method 600 and method 700 have been described separately, the vehicle 100 can implement method 600 and/or method 700. Thus, in some arrangements, the vehicle 100 can be operable to implement a method that includes at least a portion of the method 600 and at least a portion of the method 700.

A non-limiting example of the method 700 will now be described. In this example, the vehicle 100 can be traveling in a first direction on a road behind a forward vehicle. The forward vehicle may be traveling at a slow speed. The human driver of the forward vehicle may extend an arm outside of an open window of the forward vehicle and make a non-verbal gesture. For instance, the human driver may make a waiving motion with his or her arm or hand to indicate that the vehicle 100 should pass the forward vehicle.

The vehicle 100 can detect this non-verbal human gesture. The detected non-verbal human gesture can be identified. For instance, the detected non-verbal human gesture can be compared to a set of predefined non-verbal human gestures. For purposes of this example, the set of predefined non-verbal human gestures can include an arm and/or hand waiving gesture. The predefined non-verbal human gesture can have information associated with it that indicates that such a gesture is an indicator to pass the forward vehicle.

A future driving maneuver can be determined based on the identified non-verbal gesture. In this example, the future driving maneuver can be passing the forward vehicle or remaining behind the forward vehicle. Such a determination can be made based on the identified non-verbal gesture alone, or it can be made based on one or more other factors. For instance, the vehicle 100 may determine whether there are other vehicles in a passing lane.

The determined future driving maneuver can be implemented by the vehicle 100. Such implementing can be done automatically. Alternatively, a driver or other passenger of the vehicle 100 can be prompted to select whether to implement the determined future driving maneuver. The driver or other passenger can be prompted in any suitable manner. For instance, the prompt can be presented to the user using one or more portions of the output system 135 of the vehicle 100. For instance, the prompt can be displayed on a display in the vehicle 100. Alternatively or in addition, the prompt can be audibly output to the driver or other passenger over one or more auditory channels. Other forms of prompting can be used as an alternative or in addition to these forms of prompting. A driver or other passenger can respond to the prompt using, for example, one or more portions of the input system 130 of the vehicle 100.

A non-limiting example of the method 700 will now be described in relation to FIG. 3. For purposes of this example, the vehicle 100 can be traveling along a first street 320. The travel route of the vehicle can include turning right on a second street 325 that is transverse to the first street 320. A person 310 can be located at a corner 330 of the first street 320 and the second street 325. The person 310 can be waiting to cross the second street 325. The person 310 may raise a hand to make a stop gesture because, for example, an animal is crossing the second street 325.

The vehicle 100 can detect this non-verbal human gesture. The detected non-verbal human gesture can be identified. In this example, the non-verbal human gesture can be identified as a request to stop. A future driving maneuver can be determined based on the identified non-verbal gesture. In this example, the future driving maneuver can be determined to be stopping before turning onto the second street 325. Such a determination can be made based on the identified non-verbal gesture alone, or it can be made based on one or more other factors. It will be appreciated that, in other circumstances, a different future driving maneuver (e.g. continuing with a planned right turn onto the second street 325, possibly at a slower speed) can be determined. The determined future driving maneuver can be implemented by the vehicle 100.

In some instances, the person 310 may also make a verbal gesture (e.g. saying the word "stop" aloud). Such a verbal gesture can detected and/or identified. In one or more arrangements, he verbal gesture can be used to confirm the identification of the non-verbal human gesture, thereby increasing the confidence level of such identification. In one or more arrangements, the verbal gesture can be used as a factor to determine the future driving maneuver.

In still another example concerning the scenario presented in FIG. 3, the person 310 may make a go ahead waiving motion with his hand or arm. The vehicle 100 can detect this non-verbal human gesture and identify it as meaning that the person 310 is allowing the vehicle 100 to turn right onto the second street 325 before the person 310 crosses the second street 325. Based on such information, the vehicle 100 can determine a future driving maneuver (e.g. turning onto the second street 325), and the vehicle 100 can implement the determined future driving maneuver. In some arrangements, the vehicle 100 may also send a directional message to the person 310. For instance, the vehicle 100 can send a visual message indicating that it sees the person 310 and/or what its future driving maneuver will be (e.g. turn right).

In this scenario, the person 310 may also make a verbal gesture (e.g. saying "go ahead" or "proceed" aloud). Such a verbal gesture can detected and/or identified. In one or more arrangements, the verbal gesture can be used to confirm the identification of the non-verbal human gesture, thereby increasing the confidence level of such identification. In one or more arrangements, the verbal gesture can be used as a factor to determine the future driving maneuver and/or the content of the directional message.

In still another example, the vehicle can be at or approaching a four way stop. A human driver of another vehicle may be at or approaching the four way stop from a different direction. The human driver of other vehicle may waive on the vehicle 100 to make a turn. The humanoid figure 149 can be activated to respond to the non-verbal gesture of the human driver of the other vehicle. For instance, the humanoid figure 149 can respond by nodding its head 405. Subsequently, the humanoid figure 149 can waive an arm 410 and/or hand 415 as an expression of thanks to the human driver. Having detected and identified the non-verbal human gesture, the vehicle 100 can determine to turn, and the vehicle 100 can implement the turn.

In some instances, the human driver of the other vehicle may honk a horn of the vehicle (e.g. honking twice) to indicate that the driver's intention to allow the vehicle 100 to proceed. The honking of the vehicle's horn can be considered to be a verbal gesture. The honking of the horn can be detected and/or identified. In one or more arrangements, this verbal gesture can be used to confirm the identification of the non-verbal human gesture and/or as a factor to determine the future driving maneuver and/or the content of the directional message. The humanoid figure 149 can be activated to respond to the verbal gesture made by the human driver of the other vehicle.

It will be appreciated that arrangements described herein can provide numerous benefits, including one or more of the benefits mentioned herein. For example, arrangements described herein can improve the interaction between autonomous vehicles and an external environment. Arrangements described herein can improve the performance of an autonomous vehicle by taking into account information from the external environment. Arrangements described herein can improve safety for autonomous vehicles and people in the external environment of the autonomous vehicle. Arrangements described herein can increase confidence of human drivers and pedestrians when encountering autonomous vehicles. Arrangements described herein can allow an autonomous vehicle to replace common human driver tactics in certain situations. For instance, a driver who wishes to pass a slow forward vehicle may swerve slightly to the side behind the forward vehicle as a warning of an intention to pass. The autonomous vehicle can communicate the same intention by a directional message to the driver of the forward vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of interaction between an autonomous vehicle and an external environment of the autonomous vehicle, the method comprising:
   detecting the external environment of the autonomous vehicle to identify a person therein;
   locating the identified person;
   determining whether the identified person is potentially related to a future driving maneuver of the autonomous vehicle; and
   responsive to determining that the identified person is potentially related to a future driving maneuver of the autonomous vehicle, causing the autonomous vehicle to send a directional audial message to the person, the directional audial message being sent directly to the person and being directly perceptible by the person without the person using a portable communication device, wherein causing the autonomous vehicle to send the directional audial message to the person includes:
   adjusting a position of an external speaker mounted on the autonomous vehicle to be substantially aligned with the location of the identified person; and
   causing the directional audial message to be emitted from the external speaker.

2. A method of interaction between an autonomous vehicle and an external environment of the autonomous vehicle, the method comprising:
   detecting the external environment of the autonomous vehicle to identify a person therein;
   locating the identified person;
   determining whether the identified person is potentially related to a future driving maneuver of the autonomous vehicle; and
   responsive to determining that the identified person is potentially related to a future driving maneuver of the autonomous vehicle, causing the autonomous vehicle to send a directional audial message to the person, the directional audial message being sent directly to the person and being directly perceptible by the person without the person using a portable communication device,
   a plurality of external speakers being mounted on the autonomous vehicle, the plurality of external speakers including at least one external speaker on a front portion of the autonomous vehicle, at least one external speaker on a rear portion of the autonomous vehicle, at least one external speaker on a first lateral side of the autonomous vehicle, and at least one speaker on a second lateral side of the autonomous vehicle, and wherein causing the autonomous vehicle to send the directional audial message to the person includes:
   selecting at least one of the plurality of external speakers that is substantially aligned with the location of the identified person; and
   causing the directional audial message to be emitted from the selected at least one of the plurality of external speakers.

3. A method of interaction between an autonomous vehicle and an external environment of the autonomous vehicle, the method comprising:
   detecting the external environment of the autonomous vehicle to identify a person therein;
   locating the identified person;
   determining whether the identified person is potentially related to a future driving maneuver of the autonomous vehicle; and
   responsive to determining that the identified person is potentially related to a future driving maneuver of the autonomous vehicle, causing the autonomous vehicle to send a directional visual message to the person, the directional visual message being sent directly to the person and being directly perceptible by the person without the person using a portable communication device, and wherein causing the autonomous vehicle to send the directional visual message to the person includes:
   adjusting a position of an externally facing display mounted on the autonomous vehicle to be substantially aligned with the location of the identified person; and
   causing the directional visual message to be presented on the externally facing display.

4. A method of interaction between an autonomous vehicle and an external environment of the autonomous vehicle, the method comprising:
   detecting the external environment of the autonomous vehicle to identify a person therein;
   locating the identified person;
   determining whether the identified person is potentially related to a future driving maneuver of the autonomous vehicle; and
   responsive to determining that the identified person is potentially related to a future driving maneuver of the autonomous vehicle, causing the autonomous vehicle to send a directional visual message to the person, the directional visual message being sent directly to the person and being directly perceptible by the person without the person using a portable communication device,
   the autonomous vehicle including a plurality of externally facing displays mounted on the autonomous vehicle, the plurality of externally facing displays including at least one externally facing display on a front portion of the autonomous vehicle, at least one externally facing display on a rear portion of the autonomous vehicle, at least one externally facing display on a first lateral side of the autonomous vehicle, and at least one externally facing display on a second lateral side of the autonomous vehicle, and wherein causing the autonomous vehicle to send the directional visual message includes:
   selecting at least one of the plurality of externally facing displays that is substantially aligned with the location of the identified person; and
   causing the directional visual message to be presented on the selected at least one of the plurality of externally facing displays.

5. A method of interaction between an autonomous vehicle and an external environment of the autonomous vehicle, the method comprising:
   detecting the external environment of the autonomous vehicle to identify a person therein;
   locating the identified person;
   determining whether the identified person is potentially related to a future driving maneuver of the autonomous vehicle; and
   responsive to determining that the identified person is potentially related to a future driving maneuver of the autonomous vehicle, causing the autonomous vehicle to send a directional message to the person, the directional message being sent directly to the person and being directly perceptible by the person without the person using a portable communication device;

wherein sending the directional message includes activating a humanoid figure to present a non-verbal gesture, and wherein the humanoid figure is a physical object located within or on the autonomous vehicle.

6. A system for interaction between an autonomous vehicle and an external environment of the autonomous vehicle, the system comprising:
an autonomous vehicle, the autonomous vehicle including:
a sensor system operable to detect the external environment of the autonomous vehicle to identify a person therein and operable to locate the identified person;
an external speaker, the external speaker being mounted on the autonomous vehicle, the external speaker having an associated position, the position of the external speaker being adjustable;
a processor located onboard the autonomous vehicle, the processor being programmed to initiate executable operations comprising:
determining whether the identified person is potentially related to a future driving maneuver of the autonomous vehicle; and
responsive to determining that the person is potentially related to a future driving maneuver of the autonomous vehicle, causing the autonomous vehicle to send a directional audial message to the person, the directional audial message being sent directly to the person and being directly perceptible by the person without the person using a portable communication device,
wherein causing the autonomous vehicle to send the directional audial message to the person includes:
adjusting the position of the external speaker to be substantially aligned with the location of the identified person, and
causing the directional audial message to be emitted from the external speaker.

7. A system for interaction between an autonomous vehicle and an external environment of the autonomous vehicle, the system comprising:
an autonomous vehicle, the autonomous vehicle including:
a sensor system operable to detect the external environment of the autonomous vehicle to identify a person therein and operable to locate the identified person;
a plurality of external speakers mounted on the autonomous vehicle, the plurality of external speakers including at least one external speaker on a front portion of the autonomous vehicle, at least one external speaker on a rear portion of the autonomous vehicle, at least one external speaker on a first lateral side of the autonomous vehicle, and at least one speaker on a second lateral side of the autonomous vehicle;
a processor located onboard the autonomous vehicle, the processor being programmed to initiate executable operations comprising:
determining whether the identified person is potentially related to a future driving maneuver of the autonomous vehicle; and
responsive to determining that the person is potentially related to a future driving maneuver of the autonomous vehicle, causing the autonomous vehicle to send a directional audial message to the person, the directional audial message being sent directly to the person and being directly perceptible by the person without the person using a portable communication device,
wherein causing the autonomous vehicle to send the directional audial message includes:
selecting at least one of the plurality of external speakers that is substantially aligned with the location of the identified person; and
causing the directional audial message to be emitted from the selected at least one of the plurality of external speakers.

8. A system for interaction between an autonomous vehicle and an external environment of the autonomous vehicle, the system comprising:
an autonomous vehicle, the autonomous vehicle including:
a sensor system operable to detect the external environment of the autonomous vehicle to identify a person therein and operable to locate the identified person;
an externally facing display mounted on the autonomous vehicle, the externally facing display having an associated position, the position of the externally facing display being adjustable;
a processor located onboard the autonomous vehicle, the processor being programmed to initiate executable operations comprising:
determining whether the identified person is potentially related to a future driving maneuver of the autonomous vehicle; and
responsive to determining that the person is potentially related to a future driving maneuver of the autonomous vehicle, causing the autonomous vehicle to send a directional visual message to the person, the directional visual message being sent directly to the person and being directly perceptible by the person without the person using a portable communication device,
wherein causing the autonomous vehicle to send a directional visual message to the person includes:
adjusting the position of the externally facing display to be substantially aligned with the location of the identified person; and
causing the directional visual message to be presented on the externally facing display.

9. A system for interaction between an autonomous vehicle and an external environment of the autonomous vehicle, the system comprising:
an autonomous vehicle, the autonomous vehicle including:
a sensor system operable to detect the external environment of the autonomous vehicle to identify a person therein and operable to locate the identified person;
a plurality of externally facing displays mounted on the autonomous vehicle, the plurality of externally facing displays including at least one externally facing display on a front portion of the autonomous vehicle, at least one externally facing display on a rear portion of the autonomous vehicle, at least one externally facing display on a first lateral side of the autonomous vehicle, and at least one externally facing display on a second lateral side of the autonomous vehicle;
a processor located onboard the autonomous vehicle, the processor being programmed to initiate executable operations comprising:

determining whether the identified person is potentially related to a future driving maneuver of the autonomous vehicle; and
responsive to determining that the person is potentially related to a future driving maneuver of the autonomous vehicle, causing the autonomous vehicle to send a directional visual message to the person, the directional visual message being sent directly to the person and being directly perceptible by the person without the person using a portable communication device,
wherein causing the autonomous vehicle to send a directional visual message to the person includes:
selecting at least one of the plurality of externally facing displays that is substantially aligned with the location of the identified person; and
causing the directional visual message to be presented on the selected at least one of the externally facing displays.

10. A system for interaction between an autonomous vehicle and an external environment of the autonomous vehicle, the system comprising:
an autonomous vehicle, the autonomous vehicle including:
a sensor system operable to detect the external environment of the autonomous vehicle to identify a person therein and operable to locate the identified person;
a humanoid figure, the humanoid figure being a physical object located within or on the autonomous vehicle;
a processor located onboard the autonomous vehicle, the processor being programmed to initiate executable operations comprising:
determining whether the identified person is potentially related to a future driving maneuver of the autonomous vehicle; and
responsive to determining that the person is potentially related to a future driving maneuver of the autonomous vehicle, causing the autonomous vehicle to send a directional message to the person, the directional message being sent directly to the person and being directly perceptible by the person without the person using a portable communication device,
wherein causing the autonomous vehicle to send a directional message to the person includes:
activating the humanoid figure to present a non-verbal gesture.

11. A computer program product for facilitating interaction between an autonomous vehicle and an external environment of the autonomous vehicle, the computer program product comprising a non-transitory computer readable storage medium having program code embodied therewith, the program code executable by a processor to perform a method comprising:
detecting the external environment of the autonomous vehicle to identify a person therein;
locating the identified person;
determining whether the identified person is potentially related to a future driving maneuver of the autonomous vehicle;
responsive to determining that the person is potentially related to a future driving maneuver of the autonomous vehicle, causing the autonomous vehicle to send a directional message to the person, the directional message being sent directly to the person and being directly perceptible by the person without the person using a portable communication device, the directional message being one of a directional audial message or a directional visual message,
when the directional message is a directional audial message, causing the autonomous vehicle to send the directional message to the person includes:
adjusting the position of an external speaker mounted on the autonomous vehicle to be substantially aligned with the location of the identified person; and
causing the directional audial message to be emitted from the external speaker, and
when the directional message is a directional visual message, causing the autonomous vehicle to send the directional message to the person includes:
adjusting a position of an externally facing display mounted on the autonomous vehicle to be substantially aligned with the location of the identified person; and
causing the directional visual message to be presented on the externally facing display.

12. A method of interaction between an autonomous vehicle and an external environment of the autonomous vehicle, the method comprising:
detecting a non-verbal human gesture in the external environment;
identifying the detected non-verbal human gesture;
determining, using a processor, a future driving maneuver based at least in part on the identified non-verbal human gesture; and
causing the autonomous vehicle to implement the determined future driving maneuver.

13. The method of claim 12, wherein identifying the detected non-verbal human gesture includes comparing the detected non-verbal human gesture to a set of predetermined non-verbal human gestures.

14. The method of claim 12, wherein the non-verbal human gesture is made by a person in the external environment, and further including:
locating the person; and
causing the autonomous vehicle to send a directional message to the person.

15. A system for interaction between an autonomous vehicle and an external environment of the autonomous vehicle, the system comprising:
an autonomous vehicle, the autonomous vehicle including:
a sensor system operable to detect a non-verbal gesture made by a person in the external environment;
a processor being programmed to initiate executable operations comprising:
identifying a detected non-verbal human gesture;
determining a future driving maneuver based at least in part on the identified non-verbal human gesture; and
causing the autonomous vehicle to implement the determined future driving maneuver.

16. The system of claim 15, wherein identifying the detected non-verbal human gesture includes comparing the detected non-verbal human gesture to a set of predetermined non-verbal human gestures.

17. The system of claim 15, wherein the non-verbal human gesture is made by a person in the external environment, and wherein the initiate executable operations further include:
locating the person; and causing the autonomous vehicle to send a directional message to the person.

18. A computer program product for interaction between an autonomous vehicle and an external environment of the autonomous vehicle, the computer program product comprising a non-transitory computer readable storage medium having program code embodied therewith, the program code executable by a processor to perform a method comprising:
   detecting a non-verbal human gesture in the external environment;
   identifying the detected non-verbal human gesture;
   determining a future driving maneuver based at least in part on the identified non-verbal human gesture; and
   causing the autonomous vehicle to implement the determined future driving maneuver.

* * * * *